United States Patent
Kamboh

(10) Patent No.: US 11,489,864 B2
(45) Date of Patent: Nov. 1, 2022

(54) METHOD FOR DETECTING DENIAL OF SERVICE ATTACKS

(71) Applicant: Atos IT Solutions and Services, Inc., New Castle, DE (US)

(72) Inventor: Ameel Kamboh, New Castle, DE (US)

(73) Assignee: BULL SAS, Les Clayes-sous-Bois (FR)

( * ) Notice: Subject to any disclaimer, the term of this patent is extended or adjusted under 35 U.S.C. 154(b) by 986 days.

(21) Appl. No.: 16/227,908

(22) Filed: Dec. 20, 2018

(65) Prior Publication Data

US 2020/0204582 A1 Jun. 25, 2020

(51) Int. Cl.

| | |
|---|---|
| *H04M 3/436* | (2006.01) |
| *H04L 29/06* | (2006.01) |
| *H04L 9/40* | (2022.01) |
| *G06F 16/2455* | (2019.01) |

(52) U.S. Cl.
CPC ...... *H04L 63/1458* (2013.01); *G06F 16/2455* (2019.01); *H04M 3/436* (2013.01)

(58) Field of Classification Search
CPC .... H04L 63/08; G06F 16/2455; H04M 3/436; H04M 3/42374
See application file for complete search history.

(56) References Cited

U.S. PATENT DOCUMENTS

| | | | |
|---|---|---|---|
| 6,751,758 B1 * | 6/2004 | Alipui | G06F 11/0769 714/54 |
| 7,742,463 B2 * | 6/2010 | Lam | H04M 7/0078 370/352 |
| 7,864,927 B2 * | 1/2011 | Loizeaux | H04M 11/04 379/37 |
| 8,223,755 B2 * | 7/2012 | Jennings | H04M 3/5232 370/353 |
| 8,230,505 B1 | 7/2012 | Ahrens et al. | |
| 8,270,588 B2 * | 9/2012 | Schwartz | H04M 3/436 379/210.02 |
| 10,491,575 B2 * | 11/2019 | Verzun | H04L 9/0662 |
| 10,721,624 B2 * | 7/2020 | Marass | H04W 12/088 |
| 2017/0237741 A1 * | 8/2017 | Bell | G06Q 20/40 726/4 |

FOREIGN PATENT DOCUMENTS

| | | |
|---|---|---|
| EP | 3110103 A1 | 12/2016 |
| WO | 2007019583 A2 | 2/2007 |

* cited by examiner

*Primary Examiner* — Hosuk Song
(74) *Attorney, Agent, or Firm* — Arc IP Law, PC; Joseph J. Mayo

(57) ABSTRACT

A method for detecting a denial of service attach on a call center, the method including automated means for detecting at least one anomaly in calls made to the call center from at least one source, determining if a detected anomaly has a match in a historical file of previously detected anomalies, and filtering calls received from the at least one source if the detected anomaly does not have a match in the historical file of previously detected anomalies.

10 Claims, 1 Drawing Sheet

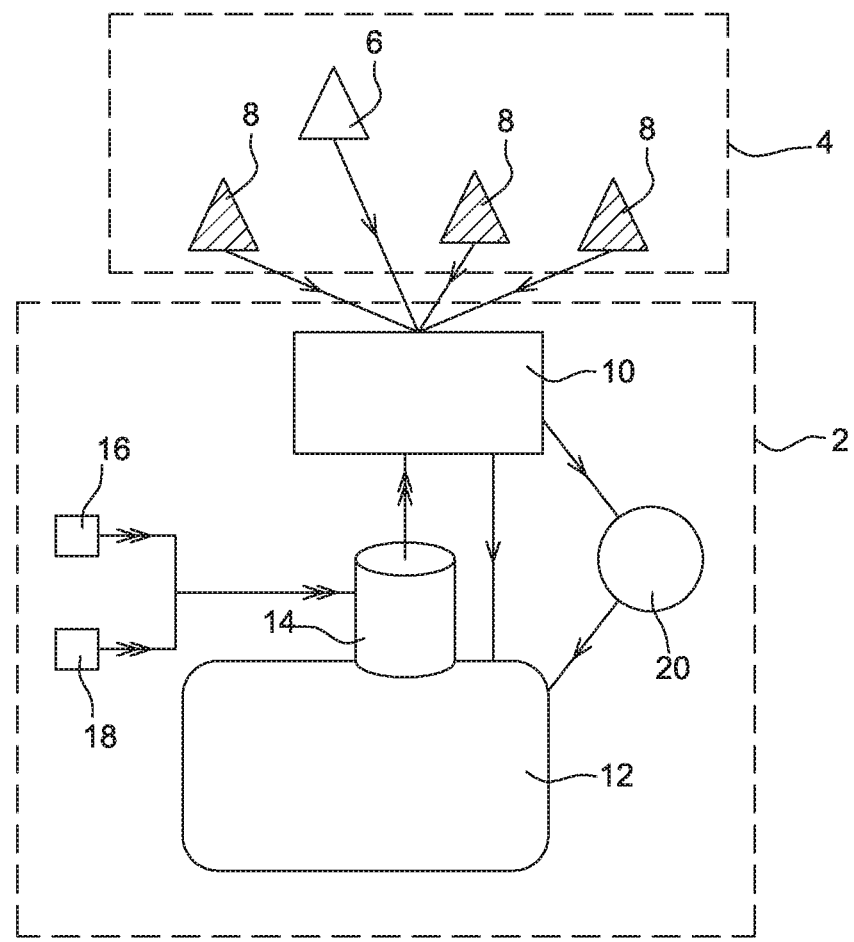

METHOD FOR DETECTING DENIAL OF SERVICE ATTACKS

FIELD OF THE INVENTION

The invention relates to the detection of denial of service attacks. More precisely, the invention relates to a method for detecting denial of service attacks targeting call centers.

BACKGROUND OF THE INVENTION

An emergency call center, also named PSAP which is the acronym of "Public Safety Answering Point", is a center where calls from the public using an emergency number are received and processed for assistance to the public. An example of emergency number is the 9-1-1 in the United-States. The ingress into the 9-1-1 operations is an open system to the public and can be vulnerable to attacks.

In an emergency call center, there are multiple methods of disrupting services to the public.

The following systems are what build up an emergency call center: an ingress carrier network, NG core services for routing calls, an emergency service IP network (ESInet), a PSAP call handling system and a group of call takers or operators.

The flow of the traffic through these systems are as follows. A public caller dials 9-1-1 into the ingress carrier network through the PSTN, which is the acronym of "Public Switched Telephone Network", or wireless communications. The internet service provider can also be a part of the ingress carrier network. The caller location is identified and routed using the NG core services to a PSAP for handling of the call. The call is then sent to the PSAP call handling system through the ESInet as an IP VOIP call. The call handling system finally delivers the call to the group of call takers on various endpoints for managing the call operations.

The flow of the traffic through these systems are as follows. A public caller dials 9-1-1 into the ingress carrier network through the PSTN, which is the acronym of "Public Switched Telephone Network", or wireless communications. The internet service provider can also be a part of the ingress carrier network. The caller location is identified and routed using the NG core services to a PSAP for handling of the call. The call is then sent to the PSAP call handling system through the ESInet as an IP VOIP call. The call handling system finally delivers the call to the group of call takers on various endpoints for managing the call operations.

Since the call center is built up of the mentioned subsystems of operations, a disruption in any of the systems can have an overall impact to the service to the public. Threats to these systems can be varying based on the resource targeted and the intent of the attack. Although IP based attacks are intended to choke out a resource by depleting the availability of the resource, other malicious attacks could be used to add delays, latency and disruption in services and statistics of the call center without depleting the resources. Sunny day attacks are attacks that are volume based but not intended for deleting resources. During this type of attack, the call center receives calls that are known as "ghost calls".

The main issue with a sunny day attack is that firstly the call center is not aware that it is under attack, and secondly the attack is call based so the call will process as normal through all of the processing systems and appear as a normal call.

These attacks at a high sustained volume can cause significant nuisance to the call center operations and significant public service disruption. The main issue with these attacks is that they are hard to detect and isolate, and cannot be easily blocked as any solution would have an impact to the public services provided.

Under a sunny day attack, the disruption is present under different forms:

Since the volume of these attack calls are much greater than normal 9-1-1 calls, there will be significant delay in processing actual 9-1-1 calls resulting in long wait times.

Since caller will wait longer in queues, this could result in callers hanging up and re-dialing 9-1-1 causing generally greater than 30 or 40% increase in traffic on the systems for processing calls.

Result in incorrect PSAP statistics used for operational measurements and funding causing further work for PSAP administrators to mine out actual data.

PSAP operators will be handling significantly more "ghost" calls causing nuisance to the call takers and may have adverse behavior towards subsequent callers.

SUMMARY OF THE INVENTION

One goal of the invention is to provide a protection against these sunny day attacks targeting a call center.

To this end, a method is provided according to the invention for detecting a denial of service attack on a call center, characterized in that automated means perform the following steps:
(i) detecting at least one anomaly in calls made to the call center from at least a source,
(ii) if an anomaly is detected at step (i), determining if the anomaly has a match in a historical file about previously detected anomalies, and
(iii) if no match is found at step (ii), filtering the calls received from the source.

Thus, upon detection of an anomaly within the received calls, which may be a sign of an undergoing attack, the comparison of the anomaly with the historical file determines the nature of the attack. If a match is found, then the nature of the attack is known as well as the defense means to be used. If no match is found, then the anomaly is the sign of a sunny day attack. This determination permits the call center to take any necessary actions accordingly, notably filtering the calls coming from the source. In this way, the disruption of the service provided by the call center is reduced.

Advantageously, the detection of step (i) is carried out by comparing the number of calls received from the source with a predetermined threshold.

This is a simple way to monitor the presence of an anomaly in the calls received by the call center.

Preferably, the predetermined threshold is calculated on the basis of a historical database about the number of calls received from the source.

The threshold is thus calculated to be an accurate representation of the calls received by the call center, which improves the accuracy of the anomaly detection, by notably reducing the number of false alarms.

Advantageously, if no match is found at step (ii), the automated means send an alert to at least one member of the call center, for example an administrator of the call center.

Thus the administrator and the operators of the call center are alerted that an attack is ongoing and may take any necessary actions accordingly.

Preferably, the method further comprises a step (iv) during which the automated means put an end to the alert when the number of calls received from the source minus the calls filtered at step (iii) goes below the predetermined threshold.

When the attack has ended, the end of the alert permits the call center to resume its normal operation as soon as possible.

Advantageously, the method further comprises a step (v) during which the automated means send data of the anomaly to the historical file about previously detected anomalies.

The nature of the attack as the defense means to be used now being known, sending the related data in the historical file permits a better reaction in case a same type of attack targets the call center in the future.

Advantageously, operators of the call center tag treated calls as part of the anomaly or not.

Thus, the operators of the call center can participate to make the detection of the anomaly faster and more reliable.

Also provided according to the invention are:
- a computer program comprising code instructions able to command the execution of the steps of a method as recited above,
- a storage medium on which is recorded a computer program as recited above, and
- a method for uploading a computer program as recited above in view of its downloading on a communication network.

A system is also provided according to the invention for detecting a denial of service attack on a call center, characterized in that it comprises automated means arranged for:

(i) detecting at least one anomaly in calls made to the call center from at least a source, (ii) if an anomaly is detected at step (i), determining if the anomaly has a match in a historical file about previously detected anomalies, and (iii) if no match is found at step (ii), filtering the calls received from the source.

Other objects of the present invention and its particular features and advantages will become more apparent from consideration of the following drawings and detailed description of the invention.

BRIEF DESCRIPTION OF THE DRAWINGS

We will now present an embodiment of the invention given as a non-limitative example and based on the attached drawings on which the only FIGURE, FIG. 1, is a diagram of a call center comprising a system for detecting a denial of service attack according to the invention.

FIG. 1 illustrates a call center 2 which is destined to provide a service to people who call the call center 2. These calls are regrouped under sources 4 which may represent different geographical areas from which the calls come from. In what follows, only one source will be considered, but the invention naturally extends to a greater number of sources.

DETAILED DESCRIPTION OF THE INVENTION

The following detailed description illustrates the technology by way of example, not by way of limitation of the principles of the invention. This description will enable one skilled in the art to make and use the technology, and describes several embodiments, adaptations, variations, alternatives and uses of the invention, including what is presently believed to be the best mode of carrying out the invention. One skilled in the art will recognize alternative variations and arrangements, and the present technology is not limited to those embodiments described hereafter.

Referring to FIG. 1, two different types of calls are issued from the source. Normal calls 6 correspond to genuine calls from people who need assistance form the call center 2. Malicious calls 8 are generated in order to disrupt the service provided by the call center 2. The malicious calls 8 generally form part of a denial of service (DOS) attack towards the call center 2.

The various components of the call center 2 will now be presented. Their functions and their uses will be described afterwards.

The call center 2 comprises a NG core service 10 for routing the calls 6, 8 coming from the source 4.

The call center 2 comprises a call handling system 12 receiving the calls 6, 8 from the NG core service 10. The call handling system 12 is arranged to dispatch the calls to human operators of the call center 2 for them to provide the service.

The call handling system 12 comprises a detection device 14 for detecting any denial of service attack targeting the call center 2. The detection device 14 is arranged for receiving data from two entities. The first entity is a historical file 16 which contains data about previously detected anomalies. The second entity is a historical database 18 which contains data about the number of calls received from the source 4 over time.

The call center 2 comprises a filter 20 arranged to prevent the transfer of some of the calls from the NG core service 10 to the call handling system 12. For example, the filter 20 may be a pocket dial filter.

The method for detecting denial of services attacks on the call center 2 will now be described.

The design of the detection system centers around a predictive analysis engine that looks at each call as it is processed in the system. The predictive analysis engine builds a pattern of behavior over time of how calls are received and handled plus analyzing current incidents and events for environmental conditions.

If the predictive analysis engine detects anomalies in call behavior or the call center administrator identifies a pattern of DOS attacks, the engine can provide feedback based on known attributes of the calls back to the NGCS core to redirect the calls to a call filter from a known trunk group or identified caller number pattern.

Once the anomaly is resolved or PSAP admin clears the condition, the predictive analysis engine can resume normal operations.

Denial of service attacks are generated by high volume malicious calls 8 targeting the call center 2. These are generally difficult to detect because the signature of these calls is identical to a normal call 6. Specifically, the phone numbers are spoofed and the PANI is from an actual pool of resources provided by the carrier.

These DOS attacks are not used to shut down the call center 2 or block network traffic. They are designed to occupy the operators or call takers on fictitious calls and significantly reducing the level of service to the public.

Since these attacks occur generally without the attacker knowing of a public incident or environmental factors, there are hints for detecting an anomaly in a call behavior:
- the malicious calls 8 will come in from a designated trunk group or carrier tower location,
- the malicious calls 8 are generally distributed in nature among a large geographical diverse area, usually localized region, the malicious calls 8 have a very short pattern of activity
the call center operators are actually answering the calls and can tag these calls as either normal or malicious,
most of the malicious calls 8 come from wireless phones and/or unregistered phone numbers.

To detect these calls, there will need to be a pattern detection software that analyzes the calls 6, 8 and call center 2 environment and start building a pattern to look for the above hints. If there is a normal call 6 and an incident record is created, this will be fed into the pattern detector software so that the software can start isolating volume of calls from a specific incident. Also CDR data from the historical file 16 is fed into the software to start looking for trunk group or carrier tower volume calls without a reported incident.

The software can start to identify anomalies on the map with a geographical boundary of the source location of the DOS attacks and feed that back to a supervisor that can provide additional input to identify a real emergency scenario versus a DOS attack.

Other mechanisms of detecting patterns of calls can be accomplished with I3 call info and additional data provided to the call center 2 during the call. These mechanisms can be added as an input into an artificial intelligence system that can do pattern detection of DOS attacks.

A single malicious call 8 does not form an anomaly. According to the method, the number of received malicious calls 8 from the source is compared to a predetermined threshold. It is calculated on the basis of the data contained in the historical database 18 so that marginal malicious calls do not create a DOS condition in the call center 2, which would be more harmful than helpful.

Once an anomaly is detected, it is compared to the anomaly data contained in the historical file 16. If a match is found, it means a similar type of DOS attack has been previously encountered and the protection means to deploy are known. If no match is found, it means that the ongoing DOS attack is one of a new type.

The containment method for detected DOS attacks cannot be to drop calls from the source 4, as normal calls 6 can be interleaved within the volume of calls.

The detection device 14 must perform the following functions:
alarm the call center administrator that a DOS condition is happening,
direct the source group where the DOS calls are coming from to the filter 20,
report when the DOS condition has cleared,
provide MIS statistics for the calls during the DOS period,
provide a method to override the containment procedure The containment method shall be a combination of automated system performance and PSAP operator actions. Since the PSAP is already under attack and performance is currently impacted, the PSAP operator can determine the correct course of action.

An Attack ID will be used for reporting from both the call handling system and the call routing system.

Once the attack has been treated, the detection device 14 put an end to the alert so that the call center 2 can resume its normal operation. Data about the attack is also sent to the historical file 16 for better response to future attacks.

While the present invention has been described with reference to particular embodiments and arrangements of parts, features, and the like, it is not limited to these embodiments or arrangements. Other embodiments will appear clearly to the skilled person.

What is claimed is:

1. A method for detecting a denial of service attack on a call center, the method comprising:
   detecting at least one anomaly in calls made to the call center from at least a source,
   if an anomaly is detected, determining if the anomaly comprises a match in a historical file about previously detected anomalies, and
   if no match is detected, filtering the calls received from the source,
   wherein the detecting the at least one anomaly is carried out by comparing a number of calls received from the source with a predetermined detection threshold.

2. The method according to claim 1, wherein the predetermined detection threshold is calculated based on a historical database about the number of calls received from the source.

3. The method according to claim 1, wherein if no match is detected, further comprising sending an alert to at least one member of the call center, said at least one member comprising an administrator of the call center.

4. The method according to claim 3, further comprising putting an end to the alert when the number of calls received from the source minus the calls that are filtered goes below the predetermined detection threshold.

5. The method according to claim 1, further comprising sending data of the anomaly to the historical file about the previously detected anomalies.

6. The method according to claim 1, further comprising tag treating the calls via operators of the call center as part of the anomaly or not.

7. A computer program comprising code instructions configured to command execution of a method for detecting a denial of service attack on a call center, the method comprising:
   detecting at least one anomaly in calls made to the call center from at least a source,
   if an anomaly is detected, determining if the anomaly comprises a match in a historical file about previously detected anomalies, and
   if no match is detected, filtering the calls received from the source,
   wherein the detecting the at least one anomaly is carried out by comparing a number of calls received from the source with a predetermined detection threshold.

8. The computer program of claim 7, wherein the computer program is recorded on a non-transitory computer-readable storage medium.

9. The computer program of claim 7, wherein the method further comprises uploading the computer program in view of downloading the computer program on a communication network.

10. A system for detecting a denial of service attack on a call center, the system comprising:
    automated means configured to
    detect at least one anomaly in calls made to the call center from at least a source,
    if an anomaly is detected, determine if the anomaly comprises a match in a historical file about previously detected anomalies, and
    if no match is detected, filter the calls received from the source,
    wherein the detect the at least one anomaly is carried out by comparing a number of calls received from the source with a predetermined detection threshold.

* * * * *